(12) United States Patent
Liu et al.

(10) Patent No.: US 7,816,848 B2
(45) Date of Patent: Oct. 19, 2010

(54) SURFACE-CONDUCTION ELECTRON EMITTER AND ELECTRON SOURCE USING THE SAME

(75) Inventors: Peng Liu, Beijing (CN); Shou-Shan Fan, Beijing (CN); Liang Liu, Beijing (CN); Kai-Li Jiang, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 459 days.

(21) Appl. No.: 11/986,850

(22) Filed: Nov. 26, 2007

(65) Prior Publication Data

US 2008/0122335 A1 May 29, 2008

(30) Foreign Application Priority Data

Nov. 24, 2006 (CN) .................. 2006 1 0157055

(51) Int. Cl.
   *H01J 1/05* (2006.01)
(52) U.S. Cl. ..................... 313/311; 313/310
(58) Field of Classification Search .............. None
   See application file for complete search history.

(56) References Cited

U.S. PATENT DOCUMENTS

| 4,940,916 | A |   | 7/1990 | Borel et al. |
|---|---|---|---|---|
| 5,945,777 | A |   | 8/1999 | Janning et al. |
| 7,276,845 | B2 | * | 10/2007 | Yamamoto et al. ........ 313/311 |
| 7,378,789 | B2 | * | 5/2008 | Jeon et al. ................. 313/495 |
| 2002/0060514 | A1 |   | 5/2002 | Nakamoto |
| 2004/0095050 | A1 |   | 5/2004 | Liu et al. |
| 2006/0097615 | A1 |   | 5/2006 | Tsakalakos et al. |
| 2007/0018552 | A1 | * | 1/2007 | Cho et al. ................. 313/311 |
| 2007/0018553 | A1 | * | 1/2007 | Cho et al. ................. 313/311 |
| 2007/0063633 | A1 |   | 3/2007 | Yokota et al. |
| 2007/0085462 | A1 | * | 4/2007 | Jeon ........................ 313/310 |
| 2007/0144780 | A1 |   | 6/2007 | Jiang et al. |
| 2007/0145878 | A1 |   | 6/2007 | Liu et al. |

FOREIGN PATENT DOCUMENTS

| CN | 1433039 | A |   | 7/2003 |
|---|---|---|---|---|
| CN | 1540713 | A |   | 10/2004 |
| CN | 1691246 | A |   | 11/2005 |
| CN | 1790598 |   |   | 6/2006 |
| JP | 2001-52598 |   |   | 2/2001 |
| JP | 2002-157951 |   |   | 5/2002 |
| JP | 2003-45366 |   |   | 2/2003 |
| JP | 2005162571 |   |   | 6/2005 |
| JP | 2005-162571 |   | * | 9/2005 |
| JP | 2007-128892 |   |   | 5/2007 |
| JP | 2007-173238 |   |   | 7/2007 |
| KR | 20030014904 |   |   | 2/2003 |
| TW | 200302499 | A |   | 8/2003 |
| TW | I257413 |   |   | 7/2006 |

* cited by examiner

*Primary Examiner*—Ashok Patel
(74) *Attorney, Agent, or Firm*—Jeffrey T. Knapp

(57) ABSTRACT

A surface-conduction electron emitter includes a substrate, two electrodes disposed on the substrate and parallel to each other, and a plurality of line-shaped carbon nanotube elements fixed on at least one electrode. One end of each carbon nanotube element points to the other electrode. An electron source using the surface-conduction electron emitter includes a substrate, a plurality of electrodes disposed on the substrate and parallel to each other, and a plurality of line-shaped carbon nanotube elements fixed on at least one electrode. One end of each carbon nanotube element points to the other electrode.

20 Claims, 14 Drawing Sheets

SURFACE-CONDUCTION ELECTRON EMITTER AND ELECTRON SOURCE USING THE SAME

RELATED APPLICATIONS

This application is related to commonly-assigned applications entitled, "METHOD FOR FABRICATING ELECTRON EMITTER", filed on Nov. 26, 2007, Ser. No. 11/986,851. Disclosure of the above-identified application is incorporated herein by reference.

BACKGROUND

1. Field of the Invention

The invention relates generally to electron emitters and, particularly, to a surface-conduction electron emitter and an electron source using the same.

2. Discussion of Related Art

Recently, development of flat panel displays (FPDs) has increased. Flat panel displays include field emission displays (FED), liquid crystal displays (LCD), plasma display panels (PDP), etc.

Among the various types of flat panel displays, liquid crystal displays are extensively investigated, but LCDs still have problems such as low brightness and narrow viewing angle when compared with the other FPDs. For plasma display panels, high energy consumption and low color fidelity are the main obstacles.

For the field emission display panels, the most developed display type is the "Spindt" type field emission display, which typically includes a plurality of micro-tip structures. However, the fabrication cost of the micro-tip structures is high and they are difficulties in increasing the size of the display.

A recently developed field emission display is a surface-conduction electron emitter display (SED) with a plurality of surface-conduction electron emitters (SCEs) therein. In the SCE, electrons are emitted from a micro-fissure in a low work function material, such as diamond or palladium oxide (PdO). The surface-conduction electron emitter display, typically, uses one surface-conduction electron emitter per pixel. The micro-fissure, which may be only a few nanometers wide, emits electrons upon electrical stimulation. FIG. 1 shows a prior art of a surface-conduction electron emitter 10 including a cathode 12 and an anode 14 with a fluorescent layer 16 formed thereon. The cathode 12 includes a substrate 110, two electrodes 112 and 114, a conductive film 116 with a gap formed thereon, and a deposit layer 118 disposed in the gap of the conductive film 116. A nanometer scale micro-fissure 120 is formed in the middle of the deposit layer 118. In use, a voltage is applied to the two electrodes 112 and 114. Due to an electron tunneling effect, electrons emitted from the electrode 112 are transmitted to the electrode 114. An accelerating voltage is applied to the anode 14. Thus, electrons are partially deviated from the transmitting direction to the anode 14, and the fluorescent layer 16 can be excited to produce a visible light.

The low work function materials used in the surface-conduction electron emitter can be simply deposited into the gap between the electrodes by using ink-jet printing. Therefore, the method for fabricating the SED is simple and the cost is low. In a conventional 40-inch SED, the contrast is about 8600:1, the thickness is about 10 millimeters, and the power used is only half that used by a same sized LCD.

However, in the above-described surface-conduction electron emitters, the micro-fissures are generally formed using high current for a long period of time. Therefore, a large amount of energy is needed during fabrication of the surface-conduction electron emitters. Additionally, because the width of the micro-fissure is only several nanometers, a portion of the electrons emitted from one electrode reach the other electrode before the accelerating voltage can deflect them from their path. Thus, the efficiency of the surface-conduction electron emitters is relatively low.

What is needed, therefore, is to provide a surface-conduction electron emitter, in which the method for fabricating the surface-conduction electron emitter is simple, and the efficiency of the surface-conduction electron emitter is increased.

SUMMARY

In one embodiment, a surface-conduction electron emitter includes a substrate, two electrodes disposed on the substrate parallel to each other, and a plurality of line-shaped carbon nanotube elements fixed on at least one electrode. One end of each carbon nanotube element points to the other electrode.

In another embodiment, an electron source includes a substrate, a plurality of electrodes disposed on the substrate and parallel to each other, and a plurality of line-shaped carbon nanotube elements fixed on at least one electrode. One end of each carbon nanotube element points to the other electrode.

Other advantages and novel features of the present surface-conduction electron emitter and electron source using the same will become more apparent from the following detailed description of preferred embodiments when taken in conjunction with the accompanying drawings.

BRIEF DESCRIPTION OF THE DRAWINGS

Many aspects of the present invention of the surface-conduction electron emitter and electron source using the same can be better understood with reference to the following drawings.

Figure 1:
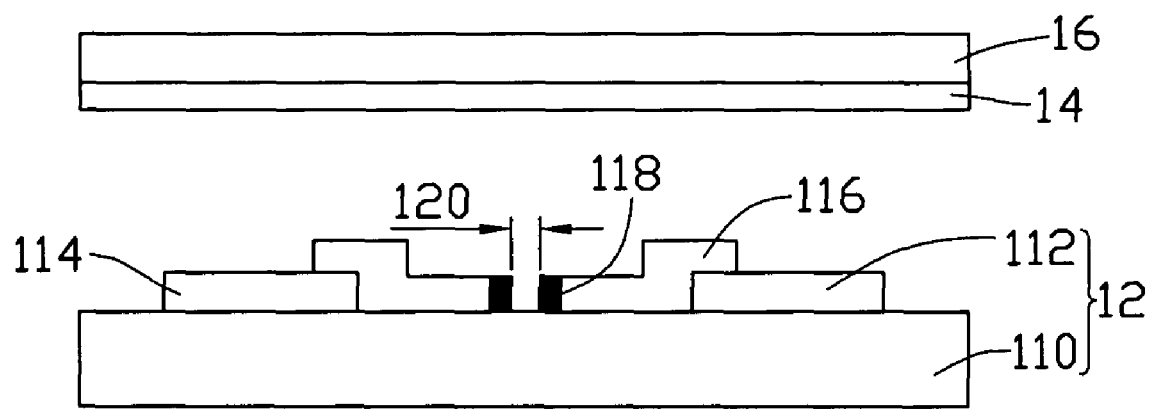
FIG. 1 is a side view of a conventional surface-conduction electron emitter.

Corresponding reference characters indicate corresponding parts throughout the several views. The exemplifications set out herein illustrate at least one preferred embodiment of the present surface-conduction electron emitter and electron source using the same, in at least one form, and such exemplifications are not to be construed as limiting the scope of the invention in any manner.

DETAILED DESCRIPTION OF PREFERRED EMBODIMENTS

Reference will now be made to the drawings to describe, in detail, embodiments of the present surface-conduction electron emitter and electron source using the same.

Figure 2:
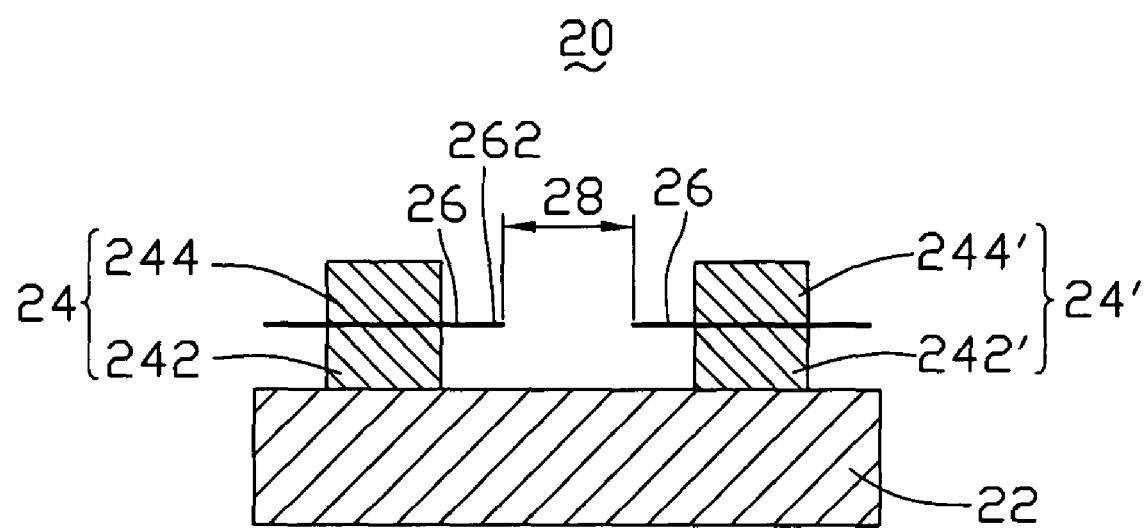
FIG. 2 is a cross-section view of a surface-conduction electron emitter, in accordance with a first embodiment.

Referring to FIG. 2, a surface-conduction electron emitter 20 in the first embodiment includes a substrate 22, a first electrode 24, a second electrode 24', and two line-shaped carbon nanotube elements 26. The first electrode 24 and the second electrode 24' are parallel to each other and disposed on the substrate 22.

The first electrode 24 and the second electrode 24' respectively include lower layers 242 and 242', and upper layers 244 and 244'. The lower layers 242 and 242' are disposed on a surface of the substrate 22. The upper layers 244 and 244' are disposed on the lower layers 242 and 242'. Two carbon nanotube elements 26 are respectively sandwiched by the upper layers 244 and 244' and the lower layers 242 and 242', and thereby, fixed on the first electrode 24 and the second electrode 24'. Each carbon nanotube element 26 includes at least one emitting end 262 protruding from the first electrode 24 and/or the second electrode 24'. The emitting ends 262 of the two carbon nanotube elements 26 are opposite to each other. A micro-fissure 28 is formed between the two opposite emitting ends 262 of the carbon nanotube elements 26.

The substrate 22 can, beneficially, be made of an insulative material selected from a group consisting of quartz, glass, ceramic, and plastic, or of a conductive material, with an insulative layer covered thereon. The insulative layer can, usefully, be an oxide layer. The thickness of the substrate 22 is dependent on the actual need/use. In the first embodiment, the substrate 22 is made of a silicon wafer with a silicon dioxide layer formed thereon. The thickness of the silicon dioxide layer is in the approximate range from 0.5 to 1 micron.

The carbon nanotube element 26 can, advantageously, include at least one material selected from a group consisting of carbon nanotubes and carbon nanotube bundles. The carbon nanotube bundles include a plurality of carbon nanotubes joined end to end.

The first electrode 24 and the second electrode 24' can, opportunely, be made of a metallic material such as titanium (Ti), platinum (Pt), gold, silver, copper, or alloys thereof. The thickness of the first electrode 24 and the second electrode 24' are in the approximate range from 20 to 150 nanometers. The width of the first electrode 24 and the second electrode 24' are in the approximate range from several microns to several tens of microns. The length of the first electrode 24 and the second electrode 24' is dependent on the actual needs/use. The width of the micro-fissure 28 is in the approximate range from several microns to several hundreds of microns. Quite suitably, in the first embodiment, the width of the first electrode 24 and the second electrode 24' are in the approximate range from 90 to 190 microns. The width of the micro-fissure 28 is about 10 microns.

The lower layers 242 and 242' can, opportunely, be made of a metallic material with a high adhesion force such as titanium (Ti), tungsten (W), or chromium (Cr) to enhance the adhesion force between the lower layers 242 and 242' and the substrate 22. The upper layers 244 and 244' can, beneficially, be made of a metallic material with high conductivity such as gold, platinum (Pt) or palladium (Pd) to enhance electrical contact and reduce resistance between the upper layers 244 and 244' and the carbon nanotube elements 26. Further, the lower layers 242 and 242' can include a plurality of metallic layers. The lower layer contacted with the substrate 22 can, advantageously, be made of a metallic material with high friction coefficient such as titanium (Ti), tungsten (W), or chromium (Cr). The upper layer contacted with the carbon nanotube elements 26 can, rather appropriately, be made of a metallic material with high conductivity such as gold, platinum (Pt) or palladium (Pd).

Figure 3:
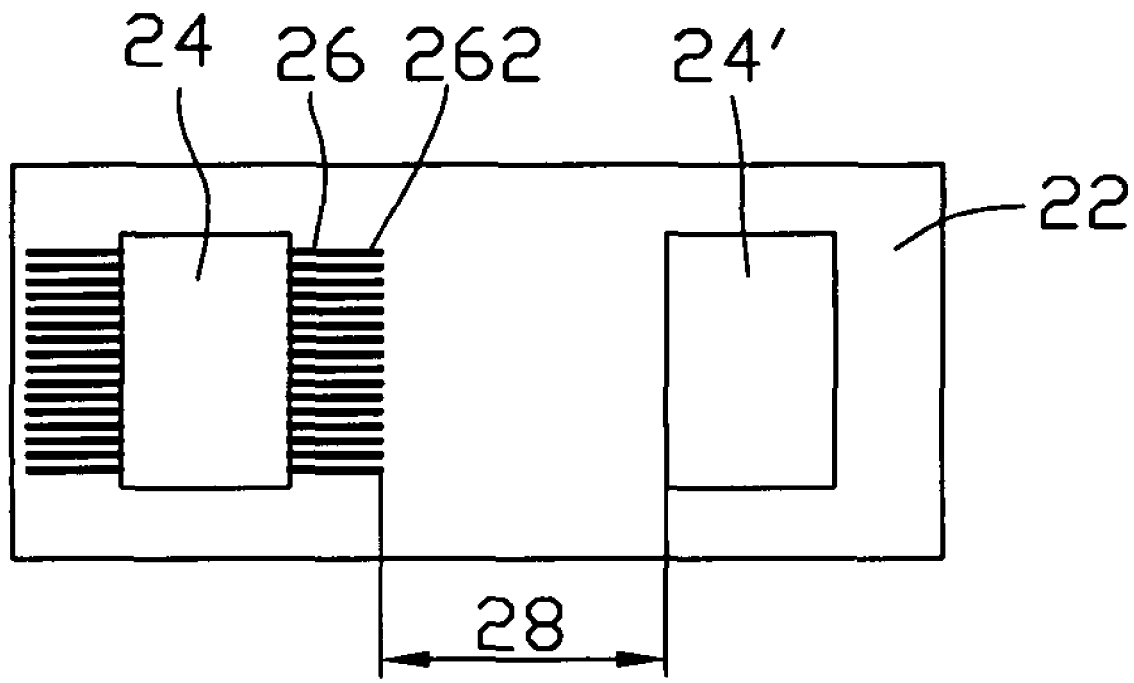
FIG. 3 and FIG. 4 are top views of the surface-conduction electron emitter of FIG. 2.
Figure 4:
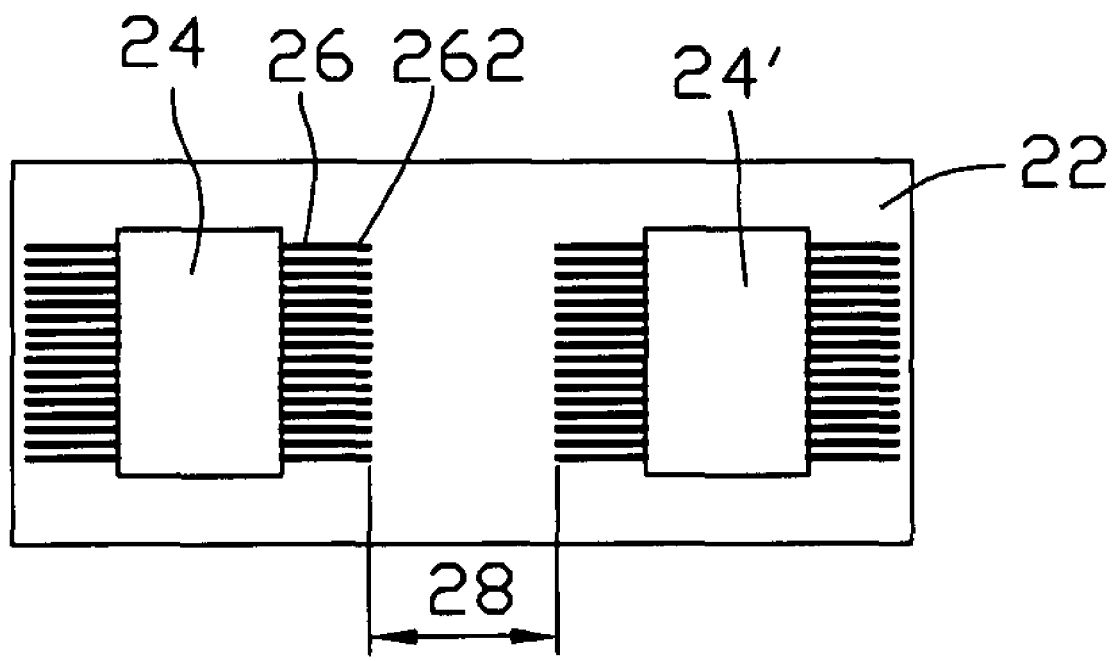

It is to be understood that, in the first embodiment, a plurality of carbon nanotube elements 26 can, beneficially, be sandwiched by the first electrode 24 and/or the second electrode 24', and thereby, be fixed thereon. Further, a plurality of carbon nanotube elements 26 are parallel to each other and the substrate 22. Referring to FIG. 3, a plurality of the carbon nanotube elements 26 can be sandwiched by the first electrode 24, only. Each carbon nanotube element 26 includes at least one emitting end 262 protruding from the first electrode 24. The at least one emitting end 262 points to the second electrode 24'. The micro-fissure 28 is, thereby, formed between the at least one emitting end 262 and the second electrode 24'. Referring to FIG. 4, a plurality of the carbon nanotube elements 26 can, rather appropriately, be respectively sandwiched by the first electrode 24 and the second electrode 24'. The carbon nanotube elements 26 include at least one emitting end 262 in each electrode. The emitting ends 262 of the first electrode 24 and the second electrode 24' are opposite to each other. The micro-fissure 28 is, thereby, formed between the opposite emitting ends 262 of the first electrode 24 and the second electrode 24'.

It will be apparent to those having ordinary skill in the field of the present invention that the first electrode 24 and/or the second electrode 24' can be integrally formed. Beneficially, the carbon nanotube elements 26 can be directly fixed on the surfaces of the first electrode 24 and/or the second electrode 24' by using a conductive glue/adhesive or be embedded in the first electrode 24 and/or the second electrode 24'.

Figure 5:
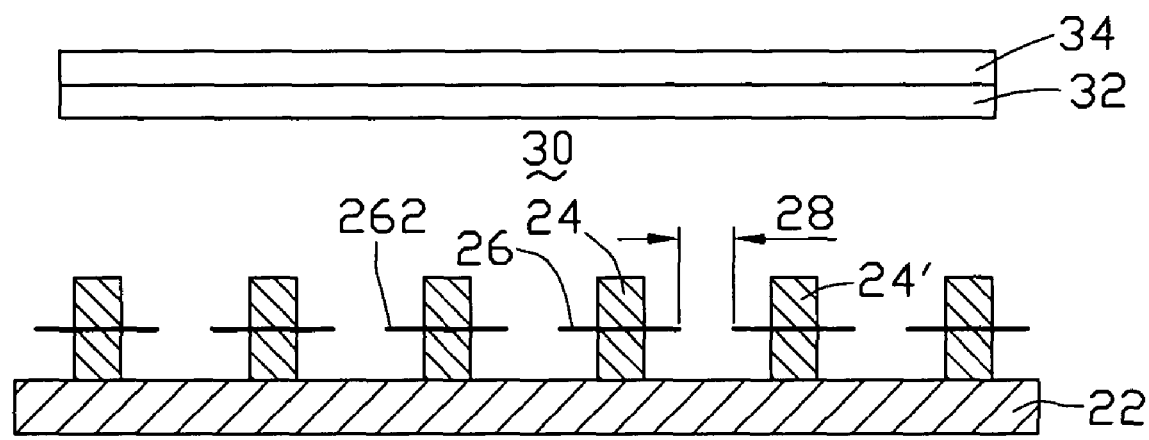
FIG. 5 is a side view of an electron source including the surface-conduction electron emitter of FIG. 2.

Referring to FIG. 5, in the first embodiment, an electron source 30 is further provided. The electron source includes a plurality of the above-described surface-conduction electron emitters 20. Pairs of the first electrodes 24 and the second electrodes 24' are disposed on the same substrate 22 parallel to each other. A plurality of the carbon nanotube elements 26 are fixed on the first electrodes 24 and the second electrodes 24'. Each carbon nanotube element 26 includes at least one emitting end 262 protruding from the electrode. The micro-fissures 28 are formed between two opposite emitting ends 262. It is to be understood that the carbon nanotube elements 26 can be fixed on the first electrodes 24 or the second electrodes 24' only. Further, the micro-fissures 28 can be formed between the emitting ends 262 and the second electrodes 24' or the first electrodes 24. The electron source 30 can be used in a SED. The SED includes an electron source 30, an anode 32 disposed above the electron source 30, and a fluorescent layer 34 formed on the anode 32. In use, a voltage is applied to the first electrode 24 and the second electrode 24'. Due to the excellent field emission property of the carbon nanotubes, electrons are able to emit from the carbon nanotube element 26 of the second electrode 24' and move toward the first electrode 24. An accelerating voltage is applied on the anode 32, and accordingly, the electrons deviate from their path and reach the anode 32. When the electrons collide against the fluorescent layer 34, a visible light is produced. In the first embodiment, when the accelerating voltage and the voltage between the first electrode 24 and the second electrode 24' is in a ratio of about 6:1, the anode current is the same as the current between the first electrode 24 and the second electrode 24'. As a result, a relatively high efficiency of the electron source 30 can be achieved.

Figure 6:
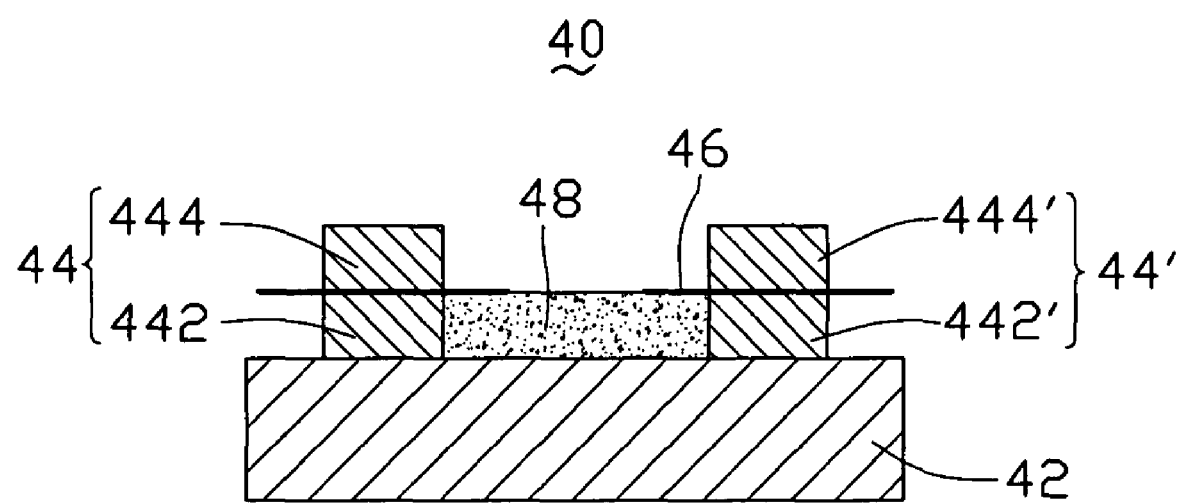
FIG. 6 is a cross-section of a surface-conduction electron emitter, in accordance with a second embodiment.

Referring to FIG. 6, the surface-conduction electron emitter 40 in the second embodiment is similar to the surface-conduction electron emitter 20 in the first embodiment, and includes a substrate 42, a first electrode 44, a second electrode 44', and two carbon nanotube elements 46. The first electrode 24 and the second electrode 24' are parallel to each other and disposed on the substrate 42.

The first electrode 44 and the second electrode 44' respectively include lower layers 442 and 442', and upper layers 444 and 444'. The lower layers 442 and 442' are disposed on the surface of the substrate 42. The upper layers 444 and 444' are disposed on the lower layers 442 and 442'. Two carbon nanotube elements 46 are respectively sandwiched by the upper layers 444 and 444' and the lower layers 442 and 442', and thereby, fixed on the first electrode 44 and the second electrode 44'. Each carbon nanotube element 46 includes at least one emitting end protruding from the first electrode 44 and/or the second electrode 44'. Two emitting ends of the two carbon nanotube elements 46 are opposite to each other. A micro-fissure is formed between the two opposite emitting ends of the carbon nanotube elements 46. A spacer 48 is further disposed on the surface of the substrate 42, between the first electrode 44 and the second electrode 44'.

The thickness of the spacer 48 is equal to the thickness of the lower layers 442 and 442'. The spacer 48 can, beneficially, be made of a material selected from a group consisting of silicon dioxide, alumina, metal oxides, and ceramic. In the second embodiment, the spacer 48 is a layer of silicon dioxide. The thickness of the spacer 48 is in the approximate range from 40 to 70 nanometers. The spacer 48 can prevent a bend or a break of the carbon nanotube elements 40 protruding from the first electrodes 44 and the second electrodes 44' that could be caused by effects of gravity or the electrical field.

Figure 7:
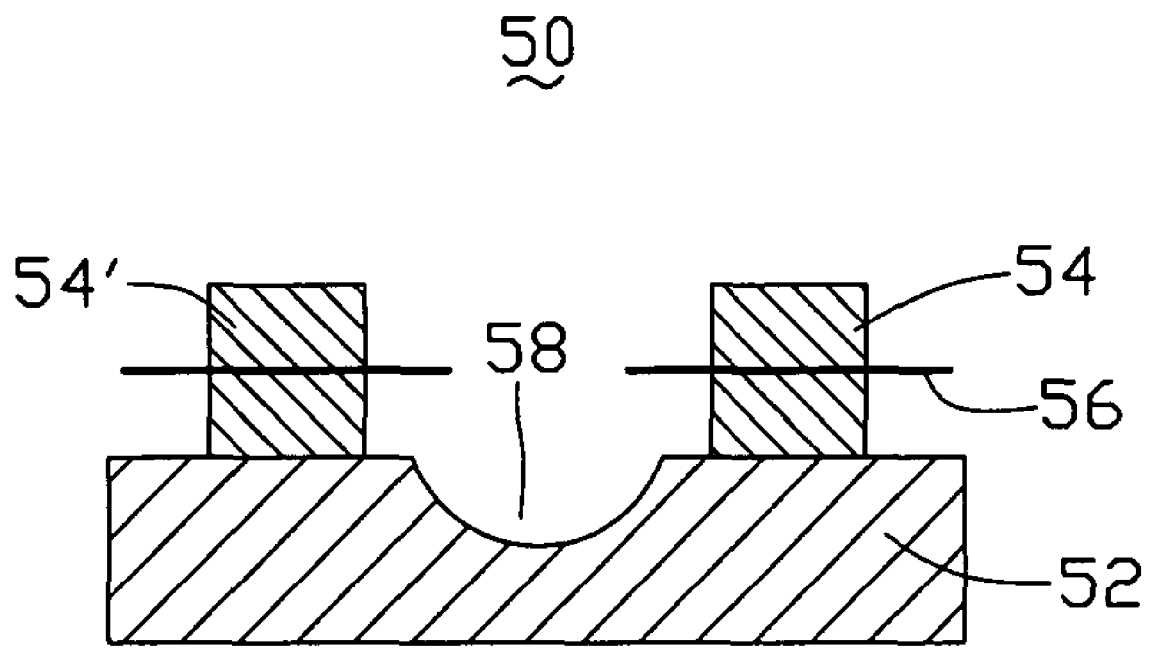
FIG. 7 is a cross-section of a surface-conduction electron emitter, in accordance with a third embodiment.

Referring to FIG. 7, the surface-conduction electron emitter 50 in the third embodiment is similar to the surface-conduction electron emitter 20 in the first embodiment, and includes a substrate 52, a first electrode 54, a second electrode 54', and two line-shaped carbon nanotube elements 56. The first electrode 54 and the second electrode 54' are parallel to each other and disposed on the substrate 52.

The two carbon nanotube elements 56 are respectively fixed on the first electrode 54 and the second electrode 54'. A groove 58 is formed on the surface of the substrate 52 between the first electrode 54 and the second electrode 54'. Due to the insulative nature of the substrate 52, a shield effect against the emitted electrons may occur. The groove 58 can increase the distance between the carbon nanotube element 56 and the substrate 52. Accordingly, the shield effect can be reduced.

Figure 8:
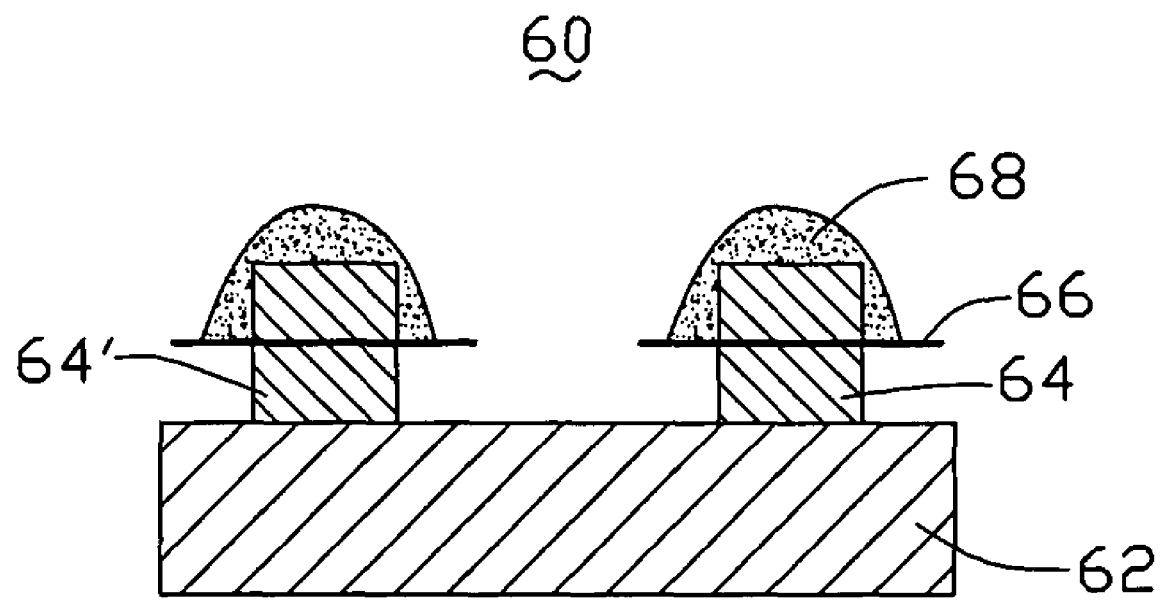
FIG. 8 is a cross-section view of a surface-conduction electron emitter, in accordance with a fourth embodiment.

Referring to FIG. 8, the surface-conduction electron emitter 60 in the fourth embodiment is similar to the surface-conduction electron emitter 20 in the first embodiment, and includes a substrate 62, a first electrode 64, a second electrode 64', and two carbon nanotube elements 66. The first electrode 64 and the second electrode 64' are parallel to each other and disposed on the substrate 62.

The two carbon nanotube elements 66 are fixed on the first electrode 64 and the second electrode 64' respectively. Two fixing layers 68 are disposed on the first electrode 64 and the second electrode 64' respectively. The protruding part of the carbon nanotube elements 66 and the top surface of the first electrode 64 and the second electrode 64' are covered by the fixing layers 68. The fixing layers 68 can, usefully, be made of an insulative material selected from a group consisting of silicon dioxide, silicon nitride, metal oxides, ceramic and photoresist. The fixing layers 68 can enhance the stability of the carbon nanotube elements 66 and prevent a draw-out effect thereof caused by the electrical field.

Figure 9:
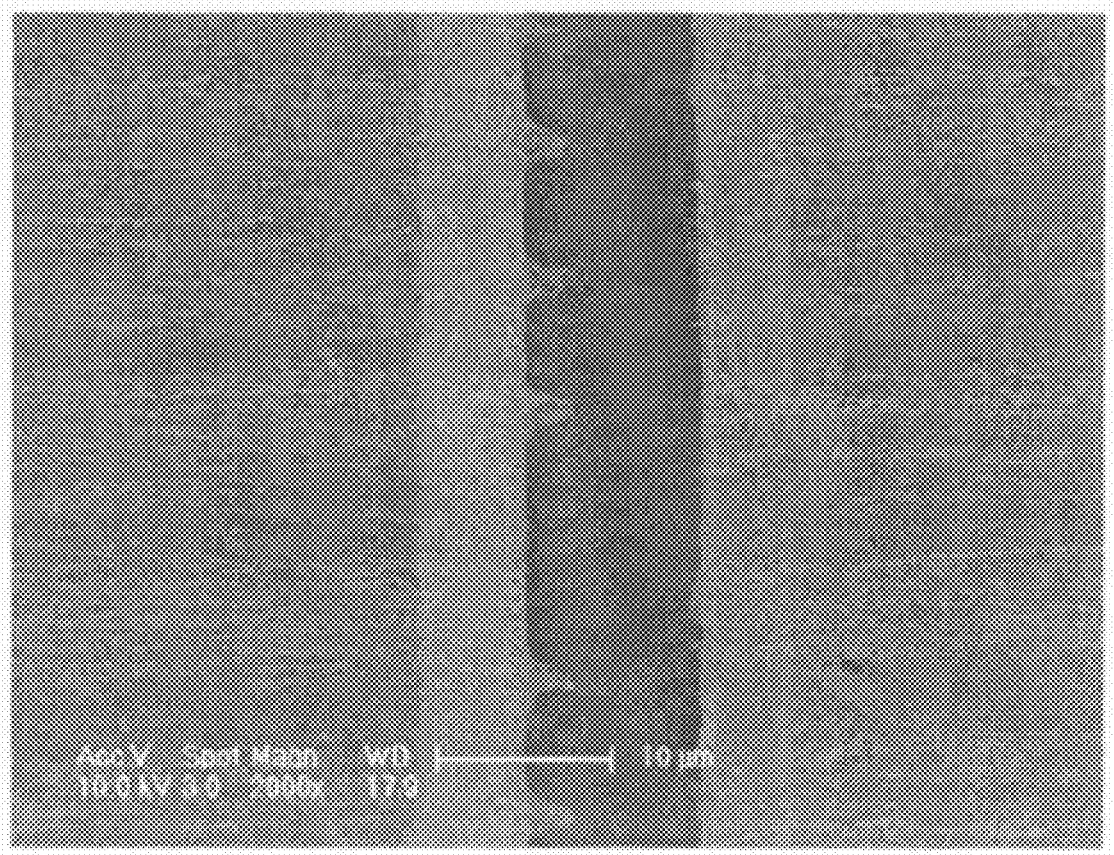
FIG. 9 shows a Scanning Electron Microscope (SEM) image of a top view of the surface-conduction electron emitter of FIG. 2.
Figure 10:
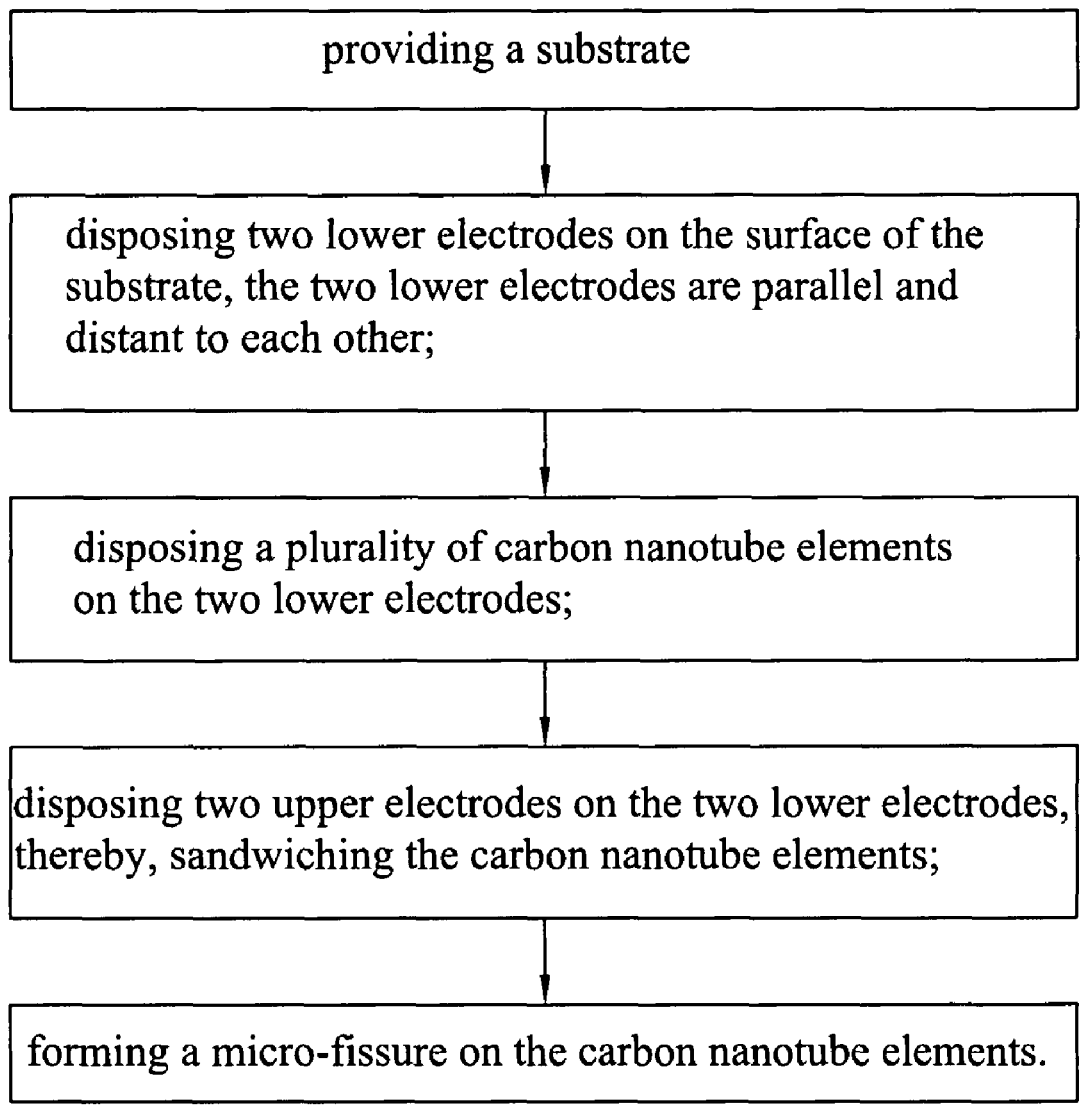
FIG. 10 is a flow chart of a method for fabricating the surface-conduction electron emitter, in accordance with the first embodiment.

Additionally, it is to be understood that a tooth-shaped structure can be further formed on the emitting ends of the carbon nanotube elements, as shown in FIG. 9, to prevent the shield effect caused by the adjacent carbon nanotube elements 26 of the first electrode 24 or the second electrode 24'. Thus, the emitting property of the carbon nanotube elements 26 can be enhanced.

Referring to FIG. 10 to FIG. 14, a method for fabricating the surface-conduction electron emitter 20 includes the steps of: (a) providing a substrate 22; (b) disposing two lower layers 242 and 242' on the surface of the substrate 22, the two lower layers 242 and 242' are parallel and apart from each other; (c) disposing a plurality of carbon nanotube elements 26 on the lower layers 242 and 242'; (d) disposing two upper layers 244 and 244' on the two lower layers 242 and 242', and thereby, sandwiching the carbon nanotube elements 26; and (e) forming a micro-fissure 28 between the carbon nanotube elements 26.

In step (a), the substrate 22 can, beneficially, be made of an insulative material selected from a group consisting of quartz, glass, ceramic, and plastic, or of a conductive material with an insulative layer formed thereon. The insulative layer can, usefully, be an oxide layer. The thickness of the substrate 22 is dependent on the actual needs/use. In the present embodiment, the substrate 22 is made of a silicon wafer with a silicon dioxide layer formed thereon. The thickness of the silicon dioxide layer is in the approximate range from 0.5 to 1 micron.

Figure 11:
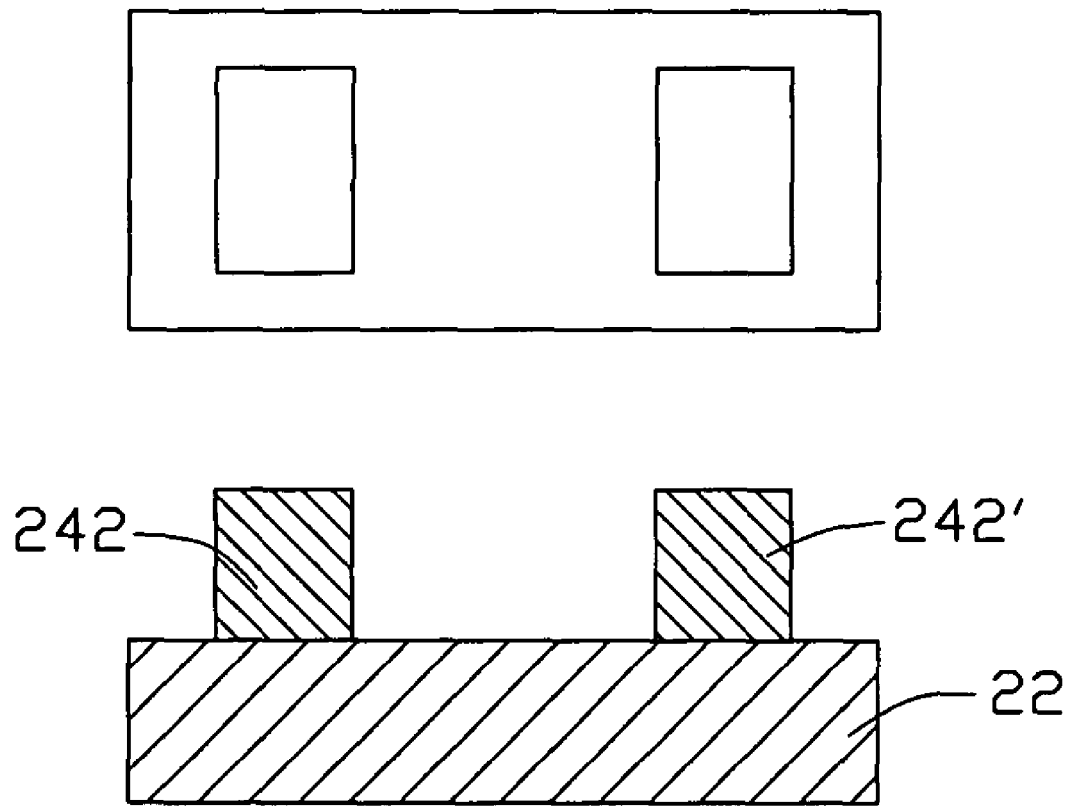
FIG. 11 to FIG. 14 are schematic views of the method of FIG. 10.

Referring to FIG. 11, in step (b), the two lower layers 242 and 242' can be formed by either a lift-off step or an etching step of photolithography.

In the lift-off step, a photoresist layer is disposed on the surface of the substrate 22. Two parallel sections of the photoresist layer are removed. Accordingly, the substrate 22 is exposed at the two parallel sections. Then, a metallic layer or a plurality of metallic layers is deposited on the substrate 22 by means of vacuum evaporation, magnetron sputtering, or electron beam evaporation. After the metallic layer has been deposited, the substrate 22 is immersed in an organic solvent to remove the photoresist layer and the metallic layer formed thereon. Thereby, the two lower layers 242 and 242' are formed on the substrate 22. Quite suitably, the organic solvent is acetone.

In the etching step, a metallic layer or a plurality of metallic layers are deposit on the substrate 22. The photoresist layer is formed on the metallic layer. Then the photoresist layer is removed except for two parallel sections. Further, the exposed substrate 22 is etched by means of chemical wet etching or reactive ion etching. Finally, the substrate is immersed in an organic solvent to remove the photoresist layer, and thereby, to achieve the two lower layers 242 and 242'. Quite suitably, the organic solvent is acetone.

The two lower layers can, opportunely, be made of a metallic material such as titanium (Ti), platinum (Pt), tungsten (W), palladium (Pd), or gold. The thickness of the two lower layers is in the approximate range from 40 to 70 nanometers. The length and the width are both in the approximate range from several tens of microns to several hundreds of microns. The distance between the two lower layers is in the approximate range from several microns to several tens of microns. Quite suitably, the lower layers 242 and 242' can be made of a metallic material with a high friction coefficient such as titanium (Ti) or tungsten (W) to enhance the friction between the lower layers 242 and 242' and the substrate 22.

Furthermore, the lower layers 242 and 242' can include a plurality of metallic layers. The lower layer contacted with the substrate 22 can, suitably, be made of a metallic material with high friction coefficient such as titanium (Ti) or tungsten (W). The upper layer contacted with the carbon nanotube elements 26 can, beneficially, be made of a metallic material with high conductivity such as gold, platinum (Pt) or palladium (Pd) to enhance the electrical contact and reduce the contact resistance between the lower layers 242 and 242' and the carbon nanotube elements 26.

Figure 12:
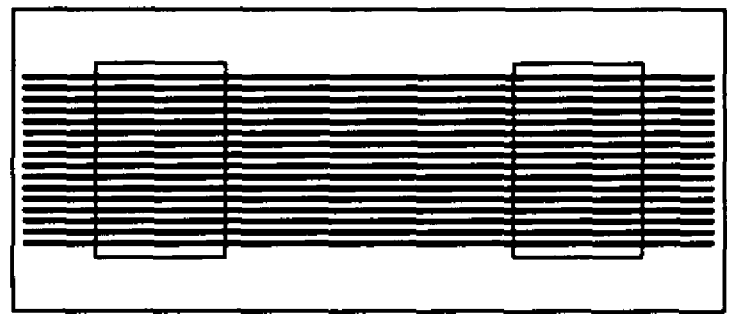
Figure 12:
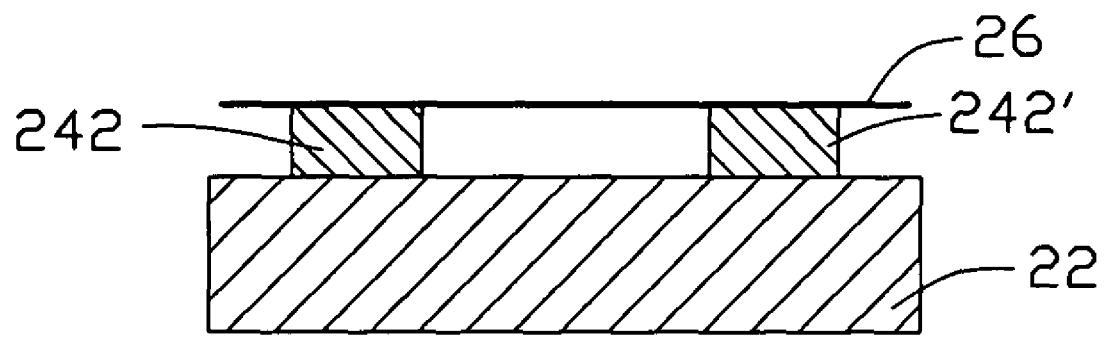

In step (c), referring to FIG. 12, a plurality of the carbon nanotube elements 26 can be adhered, sprayed or deposited on the lower layers 242 and 242'. The carbon nanotube elements 26 are parallel to each other and the substrate 22. The carbon nanotube element 26 can, advantageously, include at least one material selected from a group consisting of carbon nanotubes and carbon nanotube bundles.

In step (c), the carbon nanotube elements can be adhered on the lower layers 242 and 242' by the substeps of: (c1) providing a carbon nanotube film; (c2) adhering the carbon nanotube film on the top of the lower layers 242 and 242'; and (c3) soaking the carbon nanotube film in an organic solvent (e.g. ethanol).

In step (c1), the carbon nanotube film can, usefully, be fabricated by pulling out a plurality of carbon nanotube segments from an array of carbon nanotubes by using a tool (e.g., adhesive tape, a tweezers, or other tools allowing multiple carbon nanotubes to be gripped and pulled simultaneously). Quite suitably, the array of carbon nanotubes is a super-aligned array of carbon nanotubes. During the pulling process, the carbon nanotube segments can be pulled out end to end, due to the van der Waals attractive force between ends of the adjacent carbon nanotube segments, to form a successive carbon nanotube film (Xiaobo Zhang et al., Advanced Materials, 18, 1505 (2006)).

It is to be understood that an adhesive/glue can be directly applied on an edge of the substrate 22 with lower layers 242 and 242' formed thereon. The edge of the substrate 22 with the adhesive/glue is attached to the array of carbon nanotubes. Then the substrate 22 is moved along the direction from the one lower layer 242 to the other lower layers 242'. As such, a carbon nanotube film can be pulled out and adhered to the lower layers 242 and 242'. Finally, the carbon nanotube film as above described is soaked in an organic solvent.

In step (c), the carbon nanotube elements can be sprayed on the lower layers 242 and 242' by the substeps of: (c1') dispersing a plurality of carbon nanotubes in a solvent; (c2') spraying the solvent, with a plurality of carbon nanotubes dispersed therein, on the lower layers 242 and 242'; and (c3') volatilizing the solvent, in order to achieve a plurality of carbon nanotubes disposed on the lower layers 242 and 242'.

In step (c1'), the solvent can, beneficially, be a volatilizable organic solvent and can be selected from the group consisting of ethanol, acetone, dichloroethane, isopropanol, and combinations thereof. In another embodiment, the solvent can also be a surfactant solution (e.g. a solution of sodium dodecyl benzene sulfonate (SDBS)). In step (c2'), the lower layers 242 and 242' can, opportunely, be heated to the boiling point before sprayed by the solvent. As such, the solvent can volatilize quickly at high temperature to keep carbon nanotubes from aggregating on the lower layers 242 and 242'.

Quite usefully, an additional step (c4') of orienting the carbon nanotubes on the lower layers 242 and 242' can, advantageously, be further provided after the step (c3'). The orientation of carbon nanotubes can be formed by an electrophoretic method or an airflow method. The orientation of the carbon nanotubes is along the direction from one lower layer 242 toward the other lower layer 242'.

In step (c), the carbon nanotube elements can be deposited on the lower layers 242 and 242' by the substeps of: (c1") dispersing a plurality of carbon nanotubes in a solvent; (c2") immersing the substrate 22, with the lower layers 242 and 242' formed thereon, in the solvent with the carbon nanotubes dispersed therein; and (c3") standing for a period of time (e.g. several hours), volatilizing the solvent completely, in order to achieve a plurality of carbon nanotubes disposed on the lower layers 242 and 242'.

In step (c1"), the solvent can, beneficially, be a volatilizable organic solvent and can be selected from the group consisting of ethanol, acetone, dichloroethane, isopropanol, and combinations thereof. In another embodiment, the solvent can also be a surfactant solution (e.g. a solution of sodium dodecyl benzene sulfonate (SDBS)). In step (c2"), the carbon nanotubes deposit on the lower layers 242 and 242' under force of gravity.

Quite usefully, an additional step (c4") of orienting the carbon nanotubes on the lower layers 242 and 242' can, advantageously, be further provided after the step (c3"). The orientation of carbon nanotubes can be formed by an electrophoretic method or an airflow method. The orientation of the carbon nanotubes is along the direction from one lower layer 242 toward the other lower layer 242'.

Figure 13:
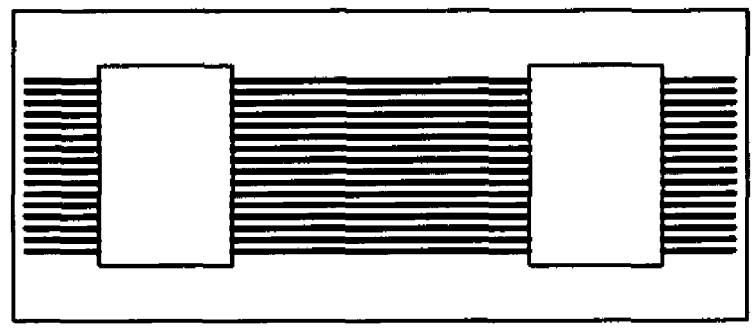
Figure 13:
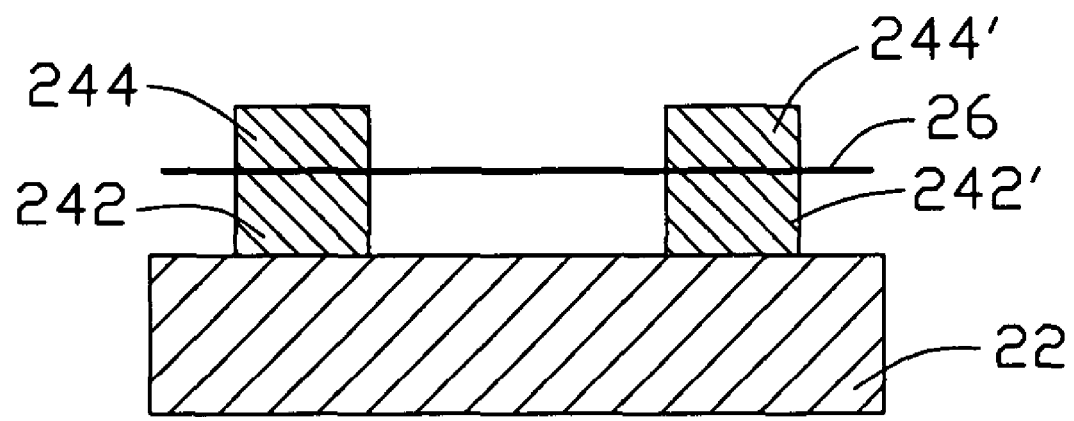

In step (d), referring to FIG. 13, the step of forming the two upper layers 244 and 244' is similar to step (b) of forming the two lower layers 242 and 242'. The material of the two upper layers can, opportunely, be a metallic material such as titanium (Ti), platinum (Pt), tungsten (W), palladium (Pd), or gold. Quite suitably, the two upper layers can be made of a metallic material with high conductivity such as palladium (Pd), or gold.

Figure 14:
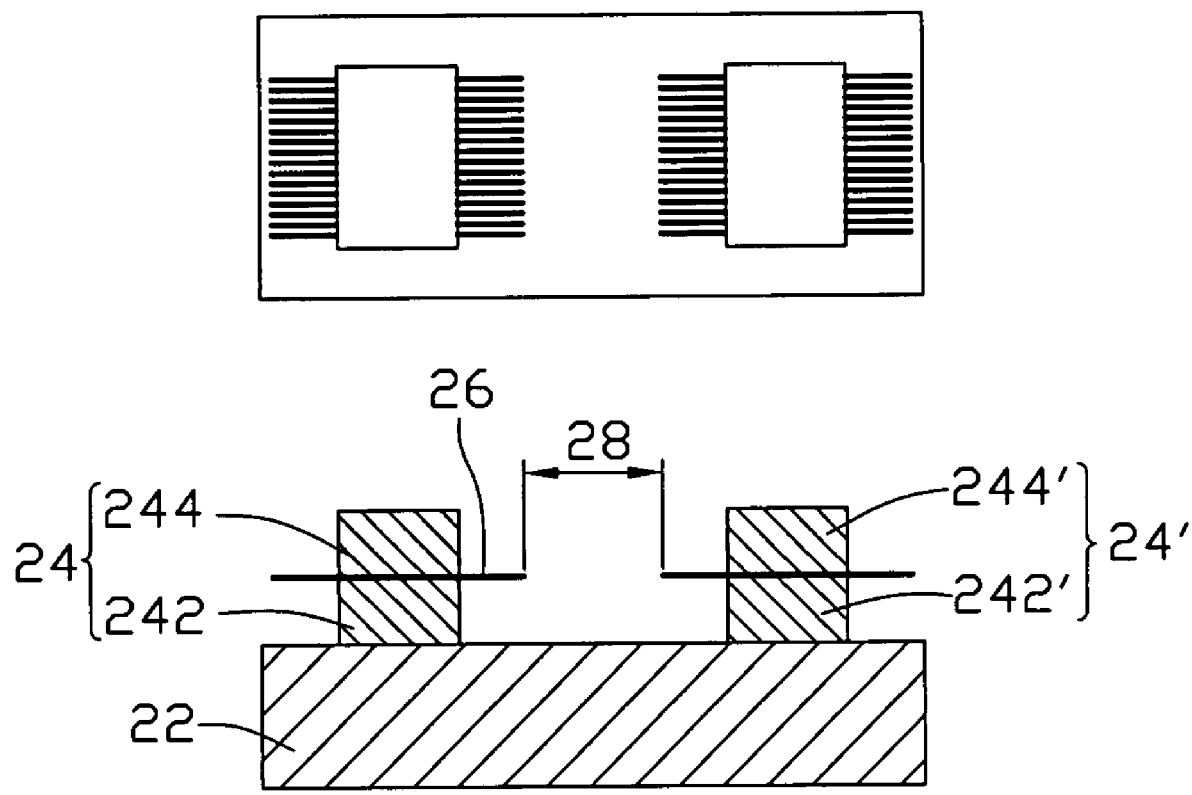

In step (e), referring to FIG. 14, the micro-fissure 28 can be formed between the carbon nanotube elements 26 by the substeps of: (e1) forming a photoresist layer on the carbon nanotube elements 26 and the surface of the upper layers 244 and 244'; (e2) exposing a section of the carbon nanotube elements from the photoresist layer by a photolithography method; and (e3) removing the exposed section of the carbon nanotube elements by means of plasma etching, and forming a micro-fissure 28 between the carbon nanotube elements 26.

The width of the micro-fissure can, opportunely, be in the approximate range from 1 to 10 microns. In step (e3), the gas used in plasma etching can be selected from a group consisting of hydrogen, oxygen, sulfur hexafluoride, and any combination thereof. In the present embodiment, the gas used in plasma etching is oxygen, the pressure is about 2 Pascal (Pa), the power is about 100 Watt (W), and the etching time is about 2 minutes.

In step (c), an excess of carbon nanotubes may be disposed on the substrate 22. Therefore, in step (e), the excess carbon nanotubes can be removed by plasma etching.

The method for fabricating the surface-conduction electron emitter 40 in the second embodiment is similar to the method for fabricating the surface-conduction electron emitter 20 in the first embodiment. In the method for fabricating the surface-conduction electron emitter 40, an additional step of forming a spacer 48 on the surface of the substrate 42 between the lower layers 442 and 442' is further provided before step (c).

The spacer 48 can, suitably, be formed by means of vacuum evaporation, magnetron sputtering, or electron beam evaporation. The spacer 48 can, beneficially, be made of a material selected from a group consisting of silicon dioxide, alumina, metal oxides, and ceramic. The thickness of the spacer 48 is less than or equal to the thickness of the lower layers 442 and 442'. In the second embodiment, the spacer is a silicon dioxide layer. The thickness of the spacer is in the approximate range from 40 to 70 nanometers.

The method for fabricating the surface-conduction electron emitter 50 in the third embodiment is similar to the method for fabricating the surface-conduction electron emitter 20 in the first embodiment. In the method for fabricating the surface-conduction electron emitter 50, an additional step of forming a groove 58 on the surface of the substrate 52 between the first electrode 54 and the second electrode 54' is further provided after step (e).

The groove 58 can, beneficially, be formed by means of chemical wet etching. Due to the insulative nature of the substrate 52, a shield effect against the emitted electrons may occur. The groove 58 can increase the distance between the carbon nanotube element 56 and the substrate 52. Accordingly, the shield effect can be reduced. The etchant used in chemical wet etching is dependent on the material of the substrate 52. In the present embodiment, the substrate 52 is a silicon wafer with a layer of silicon dioxide formed thereon, the etchant, therefore, is a solution of sodium hydroxide at about 80° C., the etching time is about 10 minutes, and the depth of the groove 58 is in the approximate range from 10 microns to 20 microns.

The method for fabricating the surface-conduction electron emitter 60 in the fourth embodiment is similar to the method for fabricating the surface-conduction electron emitter 20 in the first embodiment. In the method for fabricating the surface-conduction electron emitter 60, the photoresist layer on the first electrode 64 and the second electrode 64' and the carbon nanotube elements 66 protruding from the first electrode 64 and the second electrode 64' are preserved after step (e) to be used as the fixing layers 68. The fixing layers 68 can enhance the stability of the carbon nanotube elements 66 and prevent a draw-out effect thereof caused by the electrical field. In other embodiments, the fixing layers 68 can be further formed by a depositing step after step (d). The fixing layers 68 can, usefully, be made of an insulative material selected from a group consisting of silicon dioxide, silicon nitride, metal oxides, and ceramic.

Additionally, in step (e), a tooth-shaped structure can be further formed on the carbon nanotube elements protruding from the electrodes by using a tooth-shaped photolithography mask. Accordingly, a tooth-shaped micro-fissure can be formed between the carbon nanotube elements. Referring to FIG. 9, the tooth-shaped structure can prevent the shield effect caused by the adjacent carbon nanotube elements 26 of the first electrode 24 or the second electrode 24'. Thus, the emitting property of the carbon nanotube elements 26 can be enhanced. It is to be understood that the shape of the structure of the carbon nanotube elements is arbitrary and other shapes can be formed by the same method.

A method for fabricating the electron source 30 is similar to the method for fabricating the surface-conduction electron emitter 20 and includes the steps of: (a') providing a substrate 22; (b') disposing a plurality of lower layers on the surface of the substrate 22; (c') disposing a plurality of carbon nanotube elements 26 on the lower layers; (d') disposing a plurality of upper layers on the lower layers, thereby, sandwiching the carbon nanotube elements; and (e') forming a plurality of micro-fissures 28 between the carbon nanotube elements 26.

The lower layers are parallel to each other and in the same shape as the upper layers. The carbon nanotube elements 26 are parallel to each other.

The surface-conduction electron emitters and the electron sources using the same in the present embodiments can be simply fabricated by means of photolithography and deposition. Therefore, the cost of the fabrication is reduced. Further, the width of the micro-fissures is about several microns. The electrons emitted from the carbon nanotube elements can be effectively deviated to collide with the fluorescent layer. As such, the efficiency of the electron sources is relatively high. Additionally, due to the excellent field emission property of the carbon nanotubes, the voltage needing to be applied to the electrodes is reduced. Thus, the energy consumption of the electron emitters is reduced.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

The invention claimed is:

1. A surface-conduction electron emitter comprising:
   a substrate comprising a surface;
   a first electrode and a second electrode disposed on the substrate parallel to each other; and
   a plurality of line-shaped carbon nanotube elements fixed on the first electrode, one end of each of the carbon nanotube elements pointing to the second electrode,
   wherein the first electrode comprises a lower layer disposed on the substrate, and an upper layer disposed on the lower layer, the carbon nanotube elements are sandwiched by the upper layer and the lower layer.

2. The surface-conduction electron emitter as claimed in claim 1, wherein the carbon nanotube elements are parallel to each other and the substrate.

3. The surface-conduction electron emitter as claimed in claim 2, wherein a micro-fissure is formed between the end of each of the carbon nanotube elements and the second electrode.

4. The surface-conduction electron emitter as claimed in claim 3, wherein a width of the micro-fissure is in the approximate range from 1 to 10 microns.

5. The surface-conduction electron emitter as claimed in claim 1, wherein the lower layer comprises one or a plurality of metallic layers.

6. The surface-conduction electron emitter as claimed in claim 1, wherein a spacer is further disposed on the surface of the substrate between the first electrode and the second electrode, a thickness of the spacer is equal to a thickness of the lower layer.

7. The surface-conduction electron emitter as claimed in claim 1, wherein a fixing layer is further disposed on a top surface of the first electrode and the carbon nanotube elements.

8. The surface-conduction electron emitter as claimed in claim 1, wherein the carbon nanotube elements comprise a tooth-shaped structure.

9. The surface-conduction electron emitter as claimed in claim 1, wherein the carbon nanotube elements are carbon nanotubes or carbon nanotube bundles.

10. The surface-conduction electron emitter as claimed in claim 1, wherein the substrate is made of a material selected from the group consisting of quartz, glass, ceramic, and plastic, or a conductive material with an insulative layer formed thereon.

11. The surface-conduction electron emitter as claimed in claim 1, wherein the first electrode and the second electrode are made of a metallic material selected from the group consisting of titanium (Ti), platinum (Pt), tungsten (W), palladium (Pd), and gold (Au).

12. An electron source comprised the surface-conduction electron emitter of claim 1 comprising:
   a substrate comprising a surface;
   a plurality of electrodes disposed on the substrate parallel to each other; and a plurality of line-shaped carbon nanotube elements fixed on one electrode of the plurality of electrodes, one end of each of the carbon nanotube elements pointing to other electrode of the plurality of electrodes, wherein the one electrode comprises a lower layer disposed on the substrate, and an upper layer disposed on the lower layer, and the carbon nanotube elements are sandwiched by the upper layer and the lower layer.

13. A surface-conduction electron emitter comprising:

a substrate comprising a surface;

a first electrode and a second electrode disposed on the substrate substantially parallel to each other, each of the first electrode and the second electrode comprises a lower layer disposed on the substrate, and an upper layer disposed on the lower layer; and a plurality of line-shaped carbon nanotube elements respectively fixed on the first electrode and the second electrode, and sandwiched by the upper layer and the lower layer, each of the carbon nanotube elements comprises an end protruding from the first electrode or the second electrode.

14. The surface-conduction electron emitter as claimed in claim 13, wherein the carbon nanotube elements are substantially parallel to each other and the substrate, the ends of the carbon nanotube elements protruding from the first electrode and the ends of the carbon nanotube elements protruding from the second electrode are opposite to each other, and a micro-fissure is located between the ends that are opposite to each other.

15. The surface-conduction electron emitter as claimed in claim 13, wherein a spacer is further disposed on the surface of the substrate between the first electrode and the second electrode.

16. The surface-conduction electron emitter as claimed in claim 13, wherein a fixing layer is further disposed on top surfaces of the first electrode, the second electrode, and the carbon nanotube elements.

17. The surface-conduction electron emitter as claimed in claim 13, wherein a groove is further disposed on the surface of the substrate between the first electrode and the second electrode.

18. The surface-conduction electron emitter as claimed in claim 13, wherein the carbon nanotube elements comprises a tooth-shaped structure.

19. The surface-conduction electron emitter as claimed in claim 13, wherein the carbon nanotube elements are carbon nanotubes or carbon nanotube bundles.

20. The surface-conduction electron emitter as claimed in claim 14, wherein a width of the micro-fissure is in the approximate range from 1 to 10 microns.

* * * * *